Sept. 6, 1932.   L. D. SOUBIER ET AL   1,876,030
GLASS FURNACE
Filed Oct. 4, 1929
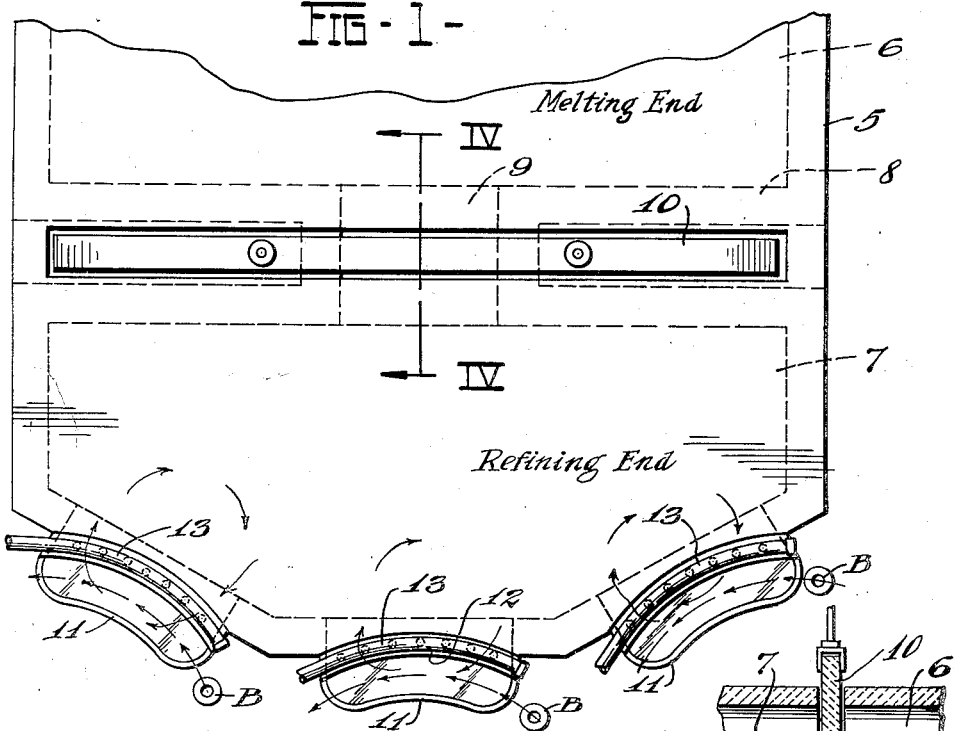
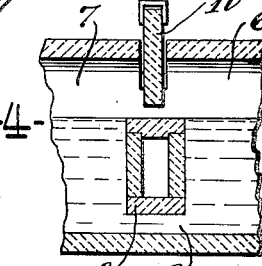
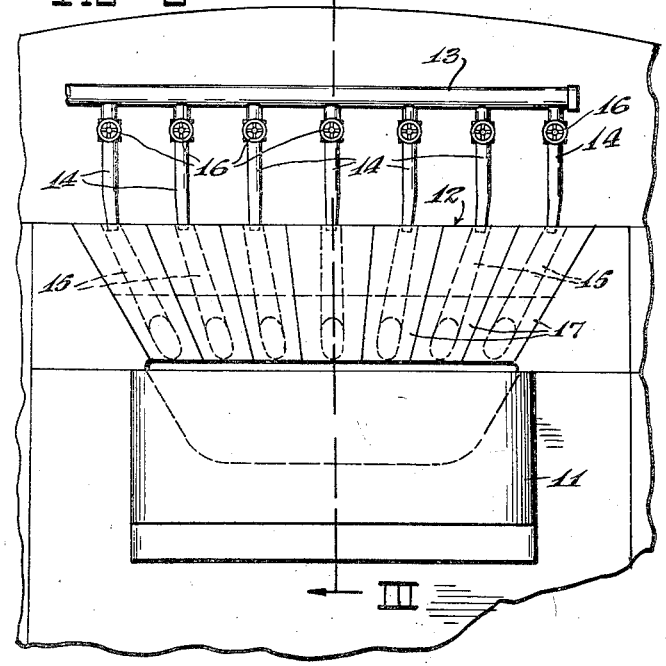
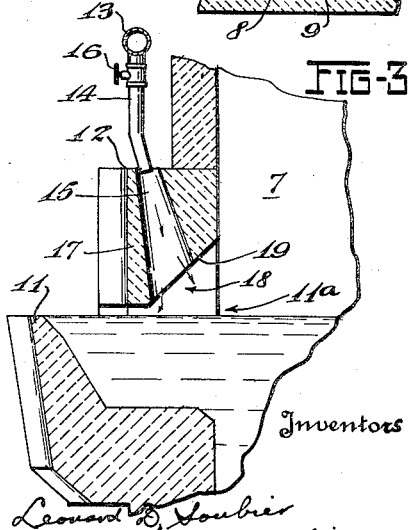
Inventors
Leonard D. Soubier
John E. McLaughlin
By J. F. Rule, Attorney Patented Sept. 6, 1932

1,876,030

UNITED STATES PATENT OFFICE

LEONARD D. SOUBIER AND JOHN E. McLAUGHLIN, OF TOLEDO, OHIO, ASSIGNORS TO OWENS-ILLINOIS GLASS COMPANY, OF TOLEDO, OHIO, A CORPORATION OF OHIO

GLASS FURNACE

Application filed October 4, 1929. Serial No. 397,174.

The present invention relates to improvements in glass furnaces and more particularly to methods of and means for regulating the temperature of the molten glass in and in proximity to the gathering area from which the molds of a forming machine obtain their mold charges.

An object of the invention is the provision of means for applying heat in variable quantities and to selected areas of the surface of molten glass without but in proximity to a gathering area from which mold charges are obtained to thereby regulate and control with unusual accuracy the temperature and general condition of the mold charges gathered.

In the drawing:

Fig. 1 is a fragmentary plan view of a glass furnace showing a group of three forebays which provide exposed gathering areas from which mold charges are obtained.

Fig. 2 is a detail front elevation of one of the forebays, showing the present invention associated therewith.

Fig. 3 is a transverse sectional view taken along the line III—III of Fig. 2.

Fig. 4 is a sectional view taken along the line IV—IV of Fig. 1.

In the drawing, a portion of a glass tank 5 or furnace is shown, including a melting compartment 6 and a refining compartment 7, the latter provided at one end of the tank and separated from the melting compartment by a bridge wall 8 extending transversely across the tank. This bridge wall is formed with a submerged throat 9 or passageway through which molten glass flows from the melting compartment to the refining compartment. The raw materials making up the glass batch are reduced to a molten condition by an intense heat introduced into the melting compartment 6. This molten glass flows through the submerged passageway 9 in the bridge wall into the refining compartment 7 and thence to exposed gathering areas in the forebays 11, from which blank molds of forming machines gather mold charges by suction.

The temperature in the melting compartment 6 is considerably higher than in the refining compartment 7. Also, it is considered that in order to obtain the best results, the temperature of the glass in the refining compartment 7 should be somewhat lower than that of the glass from which the mold charges are actually gathered. The existence of this latter condition, where there is provided means for raising the temperature of the glass, just prior to reaching the gathering area, to a degree most suitable for the production of a given type of ware, is considered ideal. In order that the desired difference in temperature in the melting and refining compartments may be maintained, a vertically adjustable gate 10 is arranged above the bridge wall 8, said gate extending lengthwise of said wall and adjustable by any suitable means (not shown). Thus, the flow of heat from the melting compartment to the refining compartment by way of the passageway over the bridge wall 8 may be accurately regulated and the desired temperature differential obtained.

Each of the forebays 11 above referred to is in the form of a trough or lip providing an extension of the refining compartment 7 with the interior of which it communicates by way of a wall opening 11ª. A jack-arch 12 is arranged above and at the inner side of the forebay 11 forming the upper wall of the opening 11ª.

The present invention provides means whereby the glass drawn from the refining compartment 7 into the three forebays, may, if necessary, be heated to three different temperatures before reaching the gathering area. In addition, each forebay is equipped with means whereby the temperature of the glass in the gathering area may be varied as required by any particular article of glassware being produced. The above results are accomplished by providing heating apparatus individual to the forebays and including adjusting means whereby heat may be applied to any area or areas desired. The heating apparatus includes a manifold 13 (Figs. 1, 2 and 3) extending lengthwise of the forebay above the jack-arch 12 and provided with a series of depending injector tubes 14 through which fuel gas or the like is introduced into a battery of mixing chambers 15. Valves 16 individual to the injector tubes regulate the effectiveness of the heating apparatus and are adjustable to determine the intensity of the applied heat as well as the areas to which the heat is applied. The mixing chambers 15 open through the top surface of individual blocks 17 which protrude beyond the main front wall of the furnace, said blocks making up the jack-arch 12. The chambers 15 extend vertically downward through the blocks 17 and open into a combustion chamber 18 between the lower side of the jack-arch and the surface of the glass. Preferably the lower side 19 of the jack-arch is inclined upwardly and inwardly so that the heat may spread inwardly over the surface of the glass and thereby provide an effective medium for bringing the glass to the desired temperature prior to reaching the gathering area.

In operation, the molten glass passes through the throat or passageway 9 to the refining compartment 7 and thence to the forebays 11. The temperature of the glass in the refining compartment may be and preferably is lower than that desired in the glass which is actually drawn into the blank molds B. Considering that the molds travel from right to left over the gathering areas in Fig. 1, it is seen that the molten glass will circulate through the areas and refining compartment in a path substantially as designated by the arrows. Under these circumstances, the injectors 14 at the right end portion of the manifold will be operated to raise the temperature of the glass, so that when it reaches the gathering area it is in proper condition for gathering into the blank molds. At the opposite or left end of the forebay, excess glass, severed from the gathered mold charges, is dropped back into the main supply body. This excess glass has been chilled to a greater or less degree by contact with the mold and a knife (not shown) and exposure to the atmosphere, so that it must be reheated and reassimilated by the main supply body in the refining compartment before it is again in condition for gathering. Such reheating may be obtained at least in part by operation of certain of the injectors at the left end of the manifold. The heat may be applied to the glass along the inner margin of the forebay in various ways, depending upon the temperature of the surface glass at different points throughout and in proximity to the gathering area, and the particular results desired. By adjusting the gate 10 as heretofore pointed out, the temperature of the glass in the refining compartment 7 may be maintained lower than the temperature of the glass in the melting compartment 6 and forebays 11. Only sufficient heat is allowed to pass from the melting compartment to the refining compartment as may be required to maintain the glass in a reasonably fluent and homogeneous condition.

Modifications may be resorted to within the spirit and scope of the appended claims.

What we claim is:

1. In combination, a tank to contain molten glass, one wall of said tank having a lateral opening therethrough, a lateral extension on said wall arranged to receive glass from the supply body and provide an exposed gathering area, a jack-arch arranged above the extension and protruding forward beyond said wall and having a battery of mixing chambers therein arranged at short intervals along the jack-arch, said chambers opening through the top surface of said protruding portion of the jack-arch and extending downward therethrough to the lower side of the jack-arch, and fuel injectors arranged over the jack-arch to direct fuel into said chambers.

2. In combination, a tank to contain molten glass, one wall of said tank having a lateral opening therethrough, a lateral extension on said wall arranged to receive glass from the supply body and provide an exposed gathering area, a jack-arch arranged above the extension and protruding forward beyond said wall and having a battery of mixing chambers therein arranged at short intervals along the jack-arch, said chambers opening through the top surface of said protruding portion of the jack-arch and extending downward therethrough to the lower side of the jack-arch, fuel injectors arranged over the jack-arch to direct fuel into said chambers, and means whereby a major portion of the injected fuel is caused to move inwardly away from the lateral extension.

3. The combination of a tank to contain molten glass comprising a vertically disposed front wall and a forebay extending forward beyond said wall, said forebay presenting an unobstructed gathering area of glass substantially coextensive with the interior horizontal dimensions of the forebay, said wall having a lateral opening therethrough along the forebay, a jack-arch extending along said opening and separating said gathering area from the main area of glass in the tank, a battery of burners arranged at short intervals along the jack-arch and providing a curtain of flame or heating gases between said areas, and means for deflecting said gases inwardly away from the gathering area and causing them to sweep over the said main area of glass in the tank.

4. The combination of a tank to contain molten glass, comprising a vertically disposed front wall and a forebay extending forward beyond said wall, said forebay presenting an unobstructed gathering area of glass substantially coextensive with the interior horizontal dimensions of the forebay, said wall having a lateral opening therethrough along the forebay, a jack-arch extending along said opening and separating said gathering area from the main area of glass in the tank, said jack-arch formed with a battery of mixing chambers arranged at short intervals therealong, said chambers opening through the upper end of the jack-arch and extending downwardly therethrough, and a battery of fuel injectors arranged over the jack-arch for directing fuel into said chambers, said chambers and jack-arch constructed and arranged to cause the gases of combustion from said chambers to be directed against the surface of the glass between said areas and deflected inwardly over the surface of glass within the tank.

Signed at Toledo, in the county of Lucas and State of Ohio, this 1st day of October, 1929.

LEONARD D. SOUBIER.
JOHN E. McLAUGHLIN.